(12) United States Patent
Otto et al.

(10) Patent No.: US 6,417,320 B1
(45) Date of Patent: Jul. 9, 2002

(54) CATALYST AND METHOD FOR ITS PRODUCTION AND USE

(75) Inventors: Brigitta Otto, Milow; Karl Ulrich Thiele, Bruchkoebel; Xiaogang Guo, Frankfurt am Main, all of (DE)

(73) Assignee: Zimmer Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/512,955

(22) Filed: Feb. 25, 2000

(30) Foreign Application Priority Data

Feb. 27, 1999 (DE) .......................... 199 08 628

(51) Int. Cl.⁷ .......................... C08G 63/78; B01J 29/06
(52) U.S. Cl. .................. 528/279; 528/275; 528/282; 528/283; 528/285; 528/286; 502/63; 502/64; 502/100; 502/103; 502/105; 502/109; 502/111; 502/155; 502/400
(58) Field of Search .................. 528/275, 279, 528/282, 283, 285, 286; 502/63, 64, 100, 103, 105, 109, 111, 155, 400

(56) References Cited

U.S. PATENT DOCUMENTS

| | | | | |
|---|---|---|---|---|
| 4,142,990 A | * | 3/1979 | Ligorati et al. ............. | 252/429 |
| 4,173,547 A | * | 11/1979 | Graff ....................... | 252/429 B |
| 4,347,162 A | * | 8/1982 | Invernizzi et al. ...... | 252/429 B |
| 5,340,907 A | * | 8/1994 | Yau et al. ................... | 528/274 |
| 5,789,528 A | * | 8/1998 | Martl et al. ................. | 528/279 |
| 5,935,897 A | * | 8/1999 | Trubenbach et al. ... | 502/527.14 |

FOREIGN PATENT DOCUMENTS

| | | | |
|---|---|---|---|
| EP | 0745630 | * | 4/1996 |
| EP | 0826713 | * | 3/1998 |
| WO | 97/47675 | * | 12/1997 |

* cited by examiner

*Primary Examiner*—Samuel A. Acquah
(74) *Attorney, Agent, or Firm*—McDonnell Boehnen Hulbert & Berghoff

(57) ABSTRACT

The production of linear polyester by the interchange of ester radicals or esterification and polycondensation of multivalent alcohols with multivalent carboxylic acids takes place by means of catalysts. In order that the catalyst features the lowest possible content of catalytically active metal compound, the carrier substance that forms the heterogeneous phase comprises particles of the finest grain and of porous structure and features a surface of great inner, reactive and/or coordinated centers, whereby a catalytically active metal compound is adsorbed in the pores.

30 Claims, No Drawings

CATALYST AND METHOD FOR ITS PRODUCTION AND USE

BACKGROUND OF THE INVENTION

1. Field of the Invention

The invention pertains to the field of catalysts and to methods of making and using them. The catalysts are used in the production of linear polyesters through the esterification or transesterification and polycondensation of multivalent alcohols with multivalent carboxylic acids.

2. Summary of the Related Art

The production of polyesters generally takes place in a manner in which a diol is converted to the corresponding dicarboxylic acid ester with a dicarboxylic acid or a low weight dicarboxylic acid ester, e.g., dimethyl ester, the dicarboxylic acid ester undergoing single or multistage polycondensation with increasing temperatures under decreased pressure. Various catalysts are used for the esterification and/or the interchange of ester radicals and polycondensation depending on the selection of the diols and dicarboxylic acids.

Catalysis in the production of polyester (particularly of the polycondensation reaction to build the polymer chain of linear polyester according to the chemical principle of polyesterification and poly-interchange of ester radicals) takes place as a result of the addition of metals that are capable of forming transition complexes with functional groups, in particular with the hydroxyl end groups. Preferred metal ions are those with three or more free valences, such as $Sb^{3+}$, $Pb^{4+}$, $Ti^{4+}$, $Bi3+$, $As^{3+}$, $Si^{4+}$, $Sn^{4+}$, $Al^{3+}$ and $Ge^{4+}$; these are effective catalysts for polycondensation. In industrial practice, $Sb^{3+}$ and $Ge^{4+}$ have proven to be preferred for the polycondensation of polyethylene terephthalate (PET), whereby metal concentrations of 150 to 300 ppm Sb and 20 to 120 ppm Ge are effective, depending on the type of polycondensation reactor; $Ti^{4-}$ in the form of, for example, its tetra alkoxide has proven useful as a catalyst in the production of polybutylene terephthalate (PBT) and polytrimethylene terephthalate (PTT) and their co-polyester due to its generally high reactivity and high hydrophilicity. For the production of PET there has been much experimentation regarding the use of Ti as a catalyst, primarily because of the possible environmentally damaging effects of Sb as a heavy metal.

Above all, the use of complex-forming ligands such as tartaric acid or citric acid according to DD-A-286 174 and WO 97/47675, or the formation of complex $TiO_2$—$SiO_2$ compounds according to U.S. Pat. No. 5,789,528, or the use of alkali modified titanium oxide according to EP-A-0 826 713, EP-A-0 827 518 and EP-A-0 799 268, or the use of mixed catalysts of Ti with other metals, as these are described in U.S. Pat. No. 5,340,907, DE-A-196 27 591 and EP-A-0 745 630, should, on the one hand, reduce the high sensitivity of the titanium alkoxides to hydrolysis and stop the associated inclination to precipitate, and on the other hand should reduce the formation of colored complex compounds that are brought about by the titanium. In many of these patent publications a concentration range of 5 to 100 ppm Ti, preferably 5 to 30 ppm, is indicated.

The following table (Table 1) lists several patent publications that disclose Ti in combination with various additions as catalysts, whereby the range of yield and the reprocessed, exemplified embodiments are compared.

TABLE 1

| Patent Publication No. | Ti compound | Ti concentration claimed | Ti concentration in example | modifier |
| --- | --- | --- | --- | --- |
| EP 0 826 713 (U.S. Pat. No. 706 950 A1; U.S. Pat. No. 910 754 A1) | Tetrabutyltitanate or tetratitanate | 5–30 ppm | 15: 30 ppm | Ultranox ® 626; 627A |
| U.S. Pat. No. 5,789,528 | $TiO_2/SiO_2$ > 90:10 | 5–500 ppm/ 10–100 ppm (relative to the oxides) | 95:5/100 ppm | Carbethoxymethyl-diethyl phosphonate; di(polyoxy ehtylene) hydroxy-methyl phosphonate |
| EP 827 518 A1 | Titantetrabutylate | 0.005–0.05 mmol/mol PTA (2.5–7.5 ppm Ti) ≦12 ppm active substance Ti = P =Co | 5 ppm | Trisnonylphenylphosphite, phosphoric acid Bi($2_B$4 di-tert-butyl-phenyl) pentaerytritdiphosphite phosphoric acid triphenylphosphate |
| DE196 27 591 A1 | Ti(IV) compound as co-catalyst for zeolite (as synergist) | 500–10000 ppm zeolite = Ti (conc. not claimed) | 3.3–59 ppm Ti =5000 ppm zeolite | Triethyl phosphate |
| EP 0 799 268A1 | S from benzene sulfonic acid = Ti of titetrais-propylate | sulfur 5–60 ppm = Ti 1–6 ppm | Ti = S: 4 = 32 ppm; 6 = 48 ppm; 6 = 0 ppm; 80 $Sb^2$ = 16 ppm | sulfonic acid/benzylsulfonic acid |
| U.S. Pat. No. 5 340 907A1 | mixed catalysts of Zn, Ti, and possibly Mn | 0.75 ppm Mn 25–100 ppm Zn 0.5–15 ppm Ti | 1 ppm Ti (=100 ppm Zn =30 ppm Co) | P as inhibitor |
| EP 0745 640 A1 | mixed catalysts of Sb, Ge and Ti | metal 5–130 ppm, of which Ti 0–20 ppm | 4 ppm Ti (=81 ppm Sb) | |

The need for a Ti concentration of >20 ppm (as required in practice) is principally evident from the fact that in industrial scale polycondensation, part of the metal catalyst is converted by traces of water to catalytically inactive $TiO_2$ precipitate. This precipitate leads to increased turbidity and/or shell-like deposits in the polyesters. Moreover, the part of the catalyst metal converted into $TiO_2$ is unavailable for polycondensation. Aside from that, higher concentrations of titanium cause a yellow color in the polyester, despite inhibition and addition of high concentrations of dye, and result in a polyester that is less brilliant overall and thermally unstable.

It is also known that Sb in the presence of water forms antimony oxide hydrates or, in the presence of phosphoric acid, e.g., forms antimony phosphates. The reduction of Sb to catalytically inactive antimony metal results in a gray color in the polyester.

SUMMARY OF THE INVENTION

The present invention comprises a composition, a method for its production, and the use of the composition for the production of linear polyester having the lowest possible content of catalytically active metal compounds and that may be used, in particular, in the production of bottles, films and other foodstuff packaging, as well as for filaments, threads, and formed bodies. The composition comprises a fine grain, porous carrier into which a catalytically active metal compound has been adsorbed.

DETAILED DESCRIPTION OF THE INVENTION

One embodiment of the invention is a composition of porous, fine grain particles made of a heterogeneous carrier substance containing catalytically active metal compounds adsorbed on the surface of the particles and on the surface within the pores of the particles. This composition affords protection of the catalytically active metal compound in the reaction medium and subsequent diffusion of the catalyst to the site of the reaction.

One advantage of the catalyst of the invention arises from the fact that the carrier substance comprises at least one substance selected from among activated charcoal, diatomaceous earth, zeolites, synthetic and natural silicates, silicone oxides, silicone oxide hydrates, fuller's earth, cross linked polymers and the like, although the principle of action is not limited to the indicated substances. The carrier substance must be able to adsorb the catalytically active metal compounds used in the invention. The particles of the carrier substance of the invention have an average grain size ($d_{50}$) of 0.05 to 2 μm, preferably 0.1 to 1 μm, and most preferably 0.2 to 0.5 μm. In the reaction medium these particles do not agglomerate substantially.

The specific surface area of the particles that form the carrier substance, as determined according to the BET method, is $\geq 50$ m$^2$/g, preferably >500 m$^2$/g.

Catalytically active metal compounds that can be used with the carrier substance of the invention are metal compounds of one or more of, for example, Ti, Sb, Ge, Sn and Al that supply the polyester reaction mixture with $Ti^{4+}$, $Sb^{3+}$, $Ge^{4+}$, $Sn^{4+}$, and $Al^{4+}$ ions, respectively, for reaction with the OH or COOH end groups of the polyester reaction mixture. Suitable catalytically active metal compounds include salts, oxides, and organic compounds of the metals.

In one embodiment of the invention, the ratio by mass or weight of the carrier substance to the catalytically active metal compound is 1:50 to 50:2, preferably 1:2 to 20:1.

The composition according to the invention is produced by reacting the carrier substance and the catalytically active metal compound by suspending them in an anhydrous liquid, preferably homogeneously suspended in the multivalent alcohol selected for the production of the polyester. It is advantageous to carry out the reaction at increased temperature, i.e., up to the boiling point of the anhydrous liquid (e.g., alcohol) used.

The purity of the composition can be increased after cooling by separating the anhydrous liquid with parts of catalytically active metal compounds that are not adsorbed in the pores of the carrier by mechanical means (e.g., centrifugation or filtration) after cooling the reaction suspension, and, if necessary, washing the residue. For simplicity, the produced composition can be stored as a suspension in the multivalent alcohol selected for the corresponding polyester process, in particular a diol.

The finest comminution of the carrier substance can expediently be made by grinding, e.g., in an impacting mill, or by milling the suspension containing the carrier substance, e.g., according to the bead-mill principle. In particular cases it may be necessary to mill the suspension once the reaction between the carrier substance and the metal compound has been terminated in order to maintain a grain distribution suited to the application.

During the production of linear polyesters using the catalyst formed according to the invention, the amount of catalyst required for the polycondensation and interchange of ester radicals is 0.1 to 100 parts of the catalyst's metal content per million parts of PET.

During the production of linear polyester or copolyesters through the interchange of ester radicals of a dicarboxylic acid dialkyl ester or through esterification of a dicarboxylic acid with a diol and subsequent one- or multi-step polycondensation, the suspension containing the composition of the invention is added during the time period from before the beginning of the esterification to just until shortly before the end of the polycondensation.

In the transesterification process, the catalyst according to the invention is added after the blocking of the transesterification catalyst, since the catalytic activity of the metal compounds adsorbed to the carrier substance can be greatly limited by the phosphorous compounds that are usually used for blocking of the transesterification catalysts.

A further advantage of the method according to the invention is that the amount of time for adding a stabilizer, such as phosphorous acid, phosphoric acid, phosphonic acid, and carboxyphosphonic acid and its compounds (at a quantity of 1 to 50 ppm, preferably 1 to 10 ppm, relative to the polyester mass) and the time at which the composition according to the invention is added is as long as possible. Thus, for example, the composition of the invention is added to the monomer mixture in the esterification process at the start, and the phosphorus-containing stabilizer is added, at the earliest, after the supply of the total monomer mixture has been completed, corresponding to a degree of esterification of 60 to 98%. For a non-catalyzed esterification the phosphorous-containing stabilizer can be added at the beginning of the esterification and at the end of the esterification.

In the production of polyester, a heavy metal-free blue dye can be added to the reaction mixture in quantities up to 3 ppm. Dyes that may be added include organic blue or blue-red dyes, in particular dyes permissible for foodstuffs, such as Estofil blue SRB-L and Estofil red SGF-T, produced by the Clariant company.

The addition of polyfunctional alcohols such as tri- or tetrahydroxy alkane, polyfunctional carboxylic acids and phosphonic acid compounds, such as are described, e.g., in U.S. Pat. No. 5,744,572 and U.S. Pat. No. 5,756,033, can also be advantageous in concentrations up to 300 ppm relative to the polyester mass. The concentration of the catalyst can thus be reduced even further.

In the examples below, values were determined as follows.

The intrinsic viscosity (I.V.) was measured at 25° C. on a solution of 500 mg polyester in 100 ml of a mixture of phenol and 1,2-dichlorbenzol (3:2 parts by weight).

The COOH end group concentration was determined by means of photometric titration of a solution of polyester in a mixture of o-cresol and chloroform (70:30 parts by weight) with 0.05 N ethanolic caustic potash solution with bromthymol blue.

The determination of diethylene glycol (DEG), isophthalic acid (IPA) and 1,4-cyclohexane dimethanol (CHDM) in polyester took place by means of gas chromatography following a previous methanolysis of 1 g polyester in 30 ml methanol with the addition of 50 mg/l zinc acetate in a bomb tube at 200° C.

Free glycol (EG) was determined by means of conversion with periodic acid to formaldehyde, reduction of the excess periodic acid with potassium iodide and titration of the liberated iodine.

The saponification number was determined through saponification with potassium hydroxide in n propanol and potentiometric titration in dimethyl formamide. The degree of esterification (U) was calculated from the saponification number (Vz) and the acid number (Sz) of the reaction mixture according to U=(Vz–Sz) 100/Vz.

The measurement of turbidity in nephelometric turbidity units 2 (NTU) took place on a 10 mass % solution of polyester in phenol/1,2-dichlorobenzol (3:2 parts by weight) with a nephelometer from the Hach company (type XR, according to U.S. Pat. No. 4,198,161) in a cuvette with a diameter of 22.2 mm analogous to norm DIN 38404, part 2 as is used for water. The intensity of the scattered light is measured in comparison to a formazine standard solution minus the value of the solvent (approximately 0.3 NTU).

The measurement of the color values L and b took place according to the Hunter L.a.b color measuring system (similar to Cielab). The polyester chips are first crystallized in a drying cabinet at 135+/−5° C. for one hour. The color values were then determined. The color tone of the polyester sample is measured in a three area color measurement device with three photocells, each of which has a red, green and blue filter connected thereto (X, Y and Z values). The evaluation was carried out according to the formula of Hunter, whereby $L = 10\sqrt{Y}$, and $$b = \frac{7.0 \cdot (Y - 0.8467\ Z)}{\sqrt{Y}}.$$

The acetaldehyde was driven from the polyester by heating in a closed container, and the acetaldehyde in the gas space of the container was determined by gas chromatography by means of head space analysis (gas chromatograph with FID and head space injection system HS40, Perkin Elmer; carrier gas:nitrogen; column: 1.5 m stainless steel; filling: Poropak Q, 80–100 mesh; sample quantity: 2 g; heating temperature: 150° C.; duration of heating: 90 min.).

Definitions

The term polyester refers to polymers comprising terephthalic acid or 2,6-naphthaline dicarboxylic acid and ethylene glycol, 1,3-propanediol, 1,4-butanediol and/or 1,4-clycohexane dimethanol and its copolymers with other dicarboxylic acids, such as, for example, isophthalic acid, terephthalic acid, 1,4-cyclohexane dicarboxylic acid, 1,6-naphthaline dicarboxylic acid, p-hydroxy benzoic acid, 4,4-bisphenyl dicarboxylic acid, adipinic acid, phthalic acid, alkane dicarboxylic acid and/or diols, such as diethylene glycol, 1,4-butandiol, 1,4-cyclohexane dimethanol and polyglycol with a molecular weight under 1000. The preferred polyester is polyethylene terephthalate that contains 0.5 to 5.0 mass % diethylene glycol and 0 to 5.0 mass % isophthalic acid, 2,6-naphthaline dicarboxylic acid, p-hydroxybenzoic acid and/or 1,4-cyclohexane dimethanol as a co-monomer. The catalysts according to the invention are also suitable for the polycondensation of hydroxycarbonic acids such as, e.g., lactic acid or glycolic acid.

EXAMPLES

The following examples further illustrate specific aspects of the invention. These examples are included for illustrative purposes only; they are not intended to limit the scope of the invention in any respect and should not be so construed.

1. Exemplified Embodiment with Activated Charcoal

To produce the catalyst suspension, activated charcoal BKP3 was used as the carrier substance, provided by A.U.G. Neue Aktivekohle and Umweltschutz GmbH, Doeberitz Germany.

A 14 mass % suspension of active charcoal suspension was prepared and filled into the circulating container of a bead mill. The suspension was transported in the circuit by means of a hose pump with a flow-through of 180–300 kg/h through the water cooled bead mill for 90 min. Then the suspension was diluted with ethylene glycol to approximately 8 mass %, milled for another 60 min. in the circuit, and then filled into the container.

The grain size analysis of the glycolic suspension yielded the following values. The grain size distribution was measured using a CAPA 700 particle counting device (dispersing media methanol, density 0.79 g/cm$^3$, viscosity 0.55 cP, density of the activated charcoal 1.90 g/cm$^3$, centrifugation speed 2000 rpm, layer thickness 10 mm). An average grain size ($d_{50}$) of 0.46 tlm was achieved.

| grain size ($\mu$m) | grain proportion (mass %) |
|---|---|
| <0.4 | 45 |
| 0.4–1 ≳ | 41 |
| 1–2 | 14 |

100.5 g of the heterogeneous phase of the carrier were then mixed in a 2 liter, three-necked flask with 510 g ethylene glycol and 60.7 g acetic acid. 118.6 g Ti (IV) butylate analytical grade were added with gentle stirring, heated to 85° C. and kept there for 4 hours with reflux. Next, the catalyst suspension was centrifuged at 1000 rpm for 10 min., the solid part washed with water-free ethylene glycol, centrifuged again under the same conditions, and adjusted to a 2% suspension with water-free ethylene glycol.

Approximately 50% of the Ti compound was found in the carrier material following this procedure; the remainder remained in the glycolic liquid phase. After equilibrating the Ti concentration, the remainder may be recycled for use in subsequent reactions with the carrier substance.

2. Exemplified Embodiment with Diatomaceous Earth

Diatomaceous earth of type MN 4 HT from the United Minerals company was treated in the same way as described in example 1. An average grain size of 0.49 μm was achieved.

| grain size (μm) | grain proportion (mass %) |
|---|---|
| <0.4 | 49 |
| 0.4–1 | 41 |
| 1–2 | 10 |

The diatomaceous earth carrier was then used to make the composition of the invention by the same method as used for activated charcoal in example 1.

3. Exemplified Embodiment with Zeolite

A zeolite of type Wessalith P from the Degussa company was treated in the same way as described in example 1. An average grain size of 0.38 μm was achieved.

| grain size (μm) | grain proportion (mass %) |
|---|---|
| <0.4 | 55 |
| 0.4–1 | 40 |
| 1–2 | 5 |

The zeolite carrier was then used to make the composition of the invention by the same method as used for activated charcoal in example 1.

Esterification and Polycondensation Tests

Comparative Examples 2–4 and Examples 5–9

The starting material was a completely catalyst-free esterification product of terephthalic acid and ethylene glycol with the following analytic data:

| | |
|---|---|
| I.V. | 0.20 dl/g |
| Vz | 565 mg KOH/g |
| Sz | 22 mg KOH/g |
| U | 96% |
| free EG | 0.12 mass % |
| DEG | 0.77 mass % |

100 g of the mixture was melted, together with the composition from the exemplified embodiment after carefully rinsing the reactor with nitrogen, at 275° C. within 50 min. under atmospheric pressure. Then, within 50 min. the pressure was gradually reduced to 0.1 mbar. and the temperature raised to 280° C. and then polycondensed for 135 min. The polycondensate that was solidified with the help of liquid nitrogen was milled and analyzed. The results are shown in Table 2.

TABLE 2

| Example No. | Catalyst | Catalyst qty. [ppm]** | I.V. [dl/g] | delta I.V. [dl/g]*** | COOH [mmol/kg] | DEG [%] |
|---|---|---|---|---|---|---|
| comparison 2 | none | 0 | 0.357 | — | 12 | 0.99 |
| comparison 3 | Sb | 200 | 0.630 | 0.273 | 8 | 0.90 |
| comparison 4 | Ti* | 10 | 0.612 | 0.255 | 11 | 1.08 |
| 5 | Sb: carrier 1 | 50 | 0.538 | 0.181 | 10 | 1.01 |
| 6 | Ti: carrier 1 1:1 | 10 | 0.717 | 0.360 | 11 | 1.04 |
| 7 | TI: carrier 1 1:1 | 3 | 0.620 | 0.263 | 10 | 1.00 |
| 8 | Ti: carrier 2 1:10 | 3 | 0.615 | 0.259 | 14 | 0.90 |
| 9 | Ti: carrier 3 1:10 | 3 | 0.64 | 0.283 | 11 | 0.91 |

Sb: antimony triacetate (S 21 from Elf Atochem, Philadelphia, USA) as a glycolic suspension Carrier 1: Activated charcoal BKP3, surface area according to the BET method: 1100 m²/g Carrier 2: Diatomaceous earth MN 4 HT, surface area according to the BET method: 50 m²/g Carrier 3: Zeolite Wessalith P, surface area according to the BET method: 900 m²/g

*Ti: Titanium (IV) butylate p.a. (from Aldrich Chemical Company, Inc., Milwaukee, Wis. USA) as a glycolic suspension

**: relative to the polyester, for antimony triacetate as Sb, for the new catalyst only to Ti

***: difference versus example 2

Comparative Example 10 and Examples 11–12

Polyethylene terephthalate was produced as described in examples 2–9, however 5000 g esterification product were used per mixture. In addition to the esterification product, 2 mass % isophthalic acid and 0.5 mass % diethylene glycol were added, respectively. The polycondensation reaction was terminated after achieving a viscosity of 0.62 dl/g terminated (current uptake of the stirrer is guide size). The results are summarized in Table 3.

TABLE 3

| Example No. | Additions | Catalyst qty. [ppm] | PK duration [min.] | I.V. [dl/g] | COOH [mmol/kg] | Color b (Hunter color measurement system) |
|---|---|---|---|---|---|---|
| comparison 10 | Ti | 6 | 130 | 0.62 | 14 | 2.1 [units?] |
|  | P | 6 |  |  |  |  |
|  | B | 0.5 |  |  |  |  |
| 11 | Ti | 6 | 100 | 0.61 | 12 | 0.6 |
|  | Ti: carrier 1 2:1 |  |  |  |  |  |
|  | P | 5 |  |  |  |  |
|  | B | 0.5 |  |  |  |  |
| 12 | Ti | 3 | 154 | 0.61 | 12 | 1.4 |
|  | Ti: carrier 1 1:0.5 |  |  |  |  |  |
|  | P | 40 |  |  |  |  |

P: added as phosphonopropionic acid from Clariant, Germnany as 2% solution in ethylene glycol B: Blue toner Cl solvent blue 104 from Clariant, France, as 0.04–0.05% glycolic suspension Comparative Example 13 and Examples 14–15

In an esterification reactor filled with approximately 30% of esterification product of the previous, analogous charge, 250 kg of a homogeneous paste comprising terephthalic acid and ethylene glycol in a molar ratio of 1:1.1 as well as the catalyst as a glycolic suspension and the blue toner wvere supplied within 80 min. at 260° C. and at atmosphericpressure. Then, raising the temperature to 270° C. esterification was continued for another 30 min. and stabilizer was added just before terminating the esterification. During the entire esterification the reaction water formed was removed by means of a column. Next, the reaction pressure was reduced to 10 mbar within 20 min. and the reaction mixture transferred into a polycondensor and polycondensed at 280–285° C. for 2–3 mbar during the indicated PK duration. After reaching the desired I.V. the vacuum was adjusted to approximately 10 mbar and the polyester melt was granulated by means of a gear pump connected to a granulator. The results are indicated in Table 4.

The composition of the invention aliows one to produce polyester of a particular quality using an amount of one or more usual ca+,alysts that is undetectable by the usual analytic methods. However, the mechanical, chemical and thermal properties of the polyester are not impaired. Moreover, the visual properties can be adjusted in a conitrolied manner dlpendingon the carrier material.

We claim:

1. A composition consisting of a carrier and a catalyst, wherein
   (a) the catalyst consists essentially of one or more polyester-catalyzing compounds, wherein each polyester-catalyzing compound independently comprises a metal selected from the group consisting of Ti, Sb, Ge, Sn, and Al; and
   (b) the carrier comprises porous, fine grain particles with surfaces and pores for adsorption of the polyester catalyst.

2. The composition according to claim 1, wherein the fine grain particles comprise at least one substance selected from the group consisting of activated charcoal, diatomaceous earth, zeolites, synthetic silicates, natural silicates, silicone oxides, silicone oxydehydrates, fullerenes, and cross linked polymers.

TABLE 4

| Example No. | Additions | Catalyst qty. [ppm] | PK duration [min.] | I.V. [dl/g] | COOH [mmol/kg] | IPA/DEG [mass %] | color L/b (Hunter color measurement system) |
|---|---|---|---|---|---|---|---|
| 13 | Ti | 5 | 125 | 0.635 | 11 | 1.99/ 1.27 | 77/10 |
|  | P | 11 |  |  |  |  |  |
|  | B | 1.5 |  |  |  |  |  |
| 14 | Ti | 4.5 | 108 | 0.635 | 10 | 1.99/ 1.27 | 78/1.9 |
|  | Ti:carrier 1 3:1 |  |  |  |  |  |  |
|  | P | 11 |  |  |  |  |  |
|  | B | 1.5 |  |  |  |  |  |
| 15 | Ti | 3 | 127 | 0.625 | 14 | 1.80/ 1.40 | 80/4.0 |
|  | Ti:carrier 1 2:1 |  |  |  |  |  |  |
|  | P | 21 |  |  |  |  |  |
|  | B | 0 |  |  |  |  |  |

P: Addition as phosphonopropionic acid from Clariant, Germany, as 2% solution in ethylene glycol B: Blue toner Cl solvent blue 104 from Clariant, France, as 0.04–0.05% glycolic suspension 3. The composition according to claim 1, wherein the average grain size (d50) of the fine grain particles is 0.05 to 2.0 μm.

4. The composition according to claim 1 wherein the average grain size (d50) of the fine grain particles is 0.1 to 2.0 μm.

5. The composition according to claim 1 wherein the average grain size (d50) of the fine grain particles is 0.2 to 0.5 μm.

6. The composition according to claim 1, wherein the surface of the fine grain particles is ≧500 m2/g as determined by the BET method.

7. The composition according to claim 1, wherein the surface of the fine grain particles is >500 m2/g as determined by the BET method.

8. The composition according to claim 1, wherein the mass ratio of the carrier substance to the metal of the catalytically active metal compound is from 1:50 to 50:1.

9. The composition according to claim 1, wherein the mass ratio of the carrier substance to the metal of the catalytically active metal compound is from 1:2 to 20:1.

10. A method of producing the composition of claim 1, the method comprising homogeneously suspending the fine grain particles and the catalytically active metal compound in an anhydrous liquid.

11. The method of claim 10, wherein the anhydrous liquid is a multivalent alcohol.

12. The method of claim 10, wherein the anhydrous liquid is a diol.

13. The method according to claim 10, wherein the reaction between the carrier substance and the catalytically active metal compound is conducted at temperatures up to the boiling point of the anhydrous liquid.

14. The method according to claim 10, wherein the liquid with non-adsorbed portions of catalytically active metal is mechanically separated from the suspension and optionally washed.

15. The method according to claim 10, wherein the carrier substance is milled.

16. The method according to claim 10, wherein the suspension containing the carrier substance is milled.

17. The method according to claim 10, wherein the suspension is milled after terminating the reaction between the carrier substance and the metal compound.

18. In a method of producing linear polyester by the interchange of ester radicals or esterification and polycondensation of multivalent alcohols with basic carboxylic acid, the improvement comprising the use of a composition of claim 1, wherein the quantity of catalyst required for the reaction is 0.1 to 100 parts of catalytically active metal compound per million parts polymer.

19. The method according to claim 18, wherein the composition of claim 1 is added during the time period from the start of esterification up until just before the end of polycondensation.

20. The method according to claim 18, wherein the catalyst is added only after blocking the catalysts for the interchange of ester radicals.

21. The method according to claim 18, wherein a phosphorous stabilizer is added after the addition of the composition when esterification has reach a point of at least 60%.

22. The method according to claim 21 wherein the phosphorous stabilizer is added in an amount of 1 to 50 ppm relative to polyester.

23. The method according to claim 21 wherein the phosphorous stabilizer is added in an amount of 1 to 10 ppm relative to polyester.

24. The method according to claim 18, wherein polyfunctional hydroxy-containing compound or compounds are added at a concentration of up to 300 ppm relative to the polyester.

25. The method according to claim 24 wherein the polyfunctional hydroxy-containing compound or compounds are selected from the group consisting of tri- or tetrahydroxy alkanes, polyfunctional carboxylic acids, and phosphonic acids.

26. The method according to claim 18, wherein a heavy metal-free blue or blue-red dye is added in quantities of up to 3 ppm.

27. A linear polyester produced according to the method of claim 18.

28. The composition according to claim 1, wherein the mass ratio of the carrier substance to the metal of the catalytically active metal compound is from 1:2 to 20:1.

29. The composition according to claim 1 wherein each polyester-catalyzing compound independently comprises a metal selected from the group consisting of Ti, Sb, Ge, and Sn.

30. The method according to claim 18 wherein a phosphorus stabilizer is added during esterification and the composition is added after esterification to catalyze polycondensation.

* * * * *